United States Patent [19]

Kinugasa et al.

[11] 4,038,457

[45] July 26, 1977

[54] FUSIBLE METAL FILM RESISTOR

[75] Inventors: Terukazu Kinugasa, Hirakata; Hyogo Hirohata, Neyagawa, both of Japan

[73] Assignee: Matsushita Electric Industrial Co., Ltd., Japan

[21] Appl. No.: 657,627

[22] Filed: Feb. 12, 1976

[51] Int. Cl.[2] .............................................. B32B 9/04

[52] U.S. Cl. .................................. 428/411; 338/308; 428/432; 428/433; 428/446; 428/454; 428/539; 427/101; 427/255

[58] Field of Search ............... 428/411, 539, 433, 432, 428/446, 454; 338/308

[56] References Cited

U.S. PATENT DOCUMENTS

| | | | |
|---|---|---|---|
| 2,772,190 | 11/1956 | Haayman et al. | 428/539 X |
| 2,791,521 | 5/1957 | Jaffe | 428/539 X |
| 3,723,175 | 3/1973 | Masuyama et al. | 428/539 X |
| 3,931,447 | 1/1976 | Grisaffe et al. | 428/539 X |
| 3,958,071 | 5/1976 | Hieber et al. | 428/411 |

*Primary Examiner*—P. C. Ives

*Attorney, Agent, or Firm*—Wenderoth, Lind & Ponack

[57] ABSTRACT

A fusible metal film resistor comprising a substrate of an electrically insulating material and a resistive film formed on the substrate, which consists of nickel, 4 to 12 weight % of phosphorus and 0.05 to 10 weight % of at least one additive metal of iron, tin, manganese and bismuth, has a stable and small temperature coefficient of resistance suitable as a precision resistor at a normal load and disconnects easily and rapidly at abnormal overload due to a rapid decrease of resistance at a high temperature which leads to fusion of the film as a result of heat generated by increased current.

8 Claims, 3 Drawing Figures

FUSIBLE METAL FILM RESISTOR

BACKGROUND OF THE INVENTION

This invention relates to a metal film resistor, and more particularly to a fusible metal film resistor.

In prior art, a metal film resistor such as nickel-chromium film resistor and tin oxide film resistor is used widely in various electronic devices as a resistor having high stability and reliability. While such a metal film resistor has a high thermal resistance, it has a deficiency in that when it becomes excessively heated due to overloading it is not easily disconnected. Therefore, such excessively heated resistor may cause burning of ambient combustible materials or destroy an electronic circuit by the overcurrent flowing therethrough.

Recently, a large demand has arisen for safe electronic equipment, and so a resistor which has high performance and reliability at normal load and which fuses easily and instantly at abnormal overload is much desired for preventing fire and destruction of an electronic circuit.

In the prior art, there has been proposed a fusible resistor such as a film resistor on the surface of which a layer of a material having a low melting point is formed. In this case, this layer is fused at overcurrent due to self-heating of the resistor and the resistor is disconnected thereby. However, such a conventional fusible resistor has some problems such as the comparatively long time necessary for fusion and unstable fusing characteristics so that sometimes the resistor film is not completely disconnected. Further, there is another problem in that in manufacturing, the step of forming layer of the material of a low melting point is required which is troublesome and results in a high cost.

SUMMARY OF THE INVENTION

Therefore, an object of the present invention is to provide a novel and improved fusible metal film resistor which is easily disconnected by fusion at overload.

Another object of the invention is to provide a metal film resistor which operates with an excellent and stable temperature coefficient of resistance at normal load and which is instantly disconnected owing to its rapid self-heating at overload.

A further object of the invention is to provide a fusible metal film resistor which can be manufactured easily with low cost.

These objects of the invention are achieved by providing a fusible metal film resistor according to the present invention, which comprises a substrate of an electrically insulating material and a resistive film formed on said substrate, said resistive film consisting of nickel, 4 to 12 weight % of phosphorus and 0.05 to 10 weight % of at least one member selected from the group consisting of iron, tin, manganese and bismuth.

BRIEF DESCRIPTION OF THE DRAWINGS

These and other objects and features of the present invention will be apparent from consideration of the following detailed description of the preferred embodiment of the invention with accompanying the drawings, in which.

DETAILED DESCRIPTION OF THE INVENTION

Figure 1:
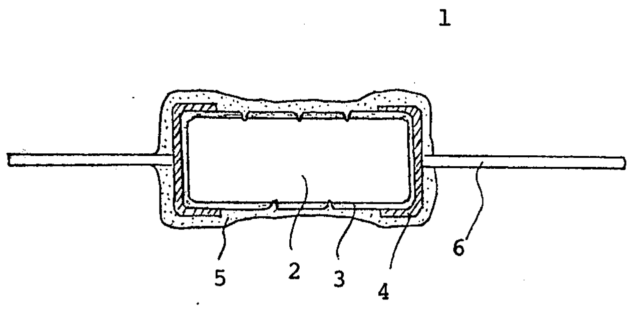
FIG. 1 is a sectional view of a fusible metal film resistor according to the invention.

The present invention is based on a finding that when excessive currant flows through a resistive film of a specific composition, the self-heating of the film accelerates so that if becomes substantially instantly disconnected. A fusible metal resistor 1 of the invention is shown in FIG. 1, in which a resistive film designated by a reference numeral 3 is formed on an insulating substrate 2 which is a rod or a tubular one. The substrate 2 is desirably made of ceramic or glass. After mounting caps 4 to the both ends of the substrate and attaching lead wires 6 to the respective caps, the whole is covered with a protection layer 5 of an electrically insulating material, as shown in the figure. The resistive film 3 is a nickel-alloy film which consists of nickel, 4 to 12 weight % of phosphorus and 0.05 to 10 weight % of at least one member selected from the group consisting of iron, tin, manganese and bismuth. Similar to the usual metal film resistor, the resistive film 3 is spirally grooved so as to provide a desired resistance value. The caps 4 are press fitted to the substrate and connected to the resistive film 3.

Figure 2:
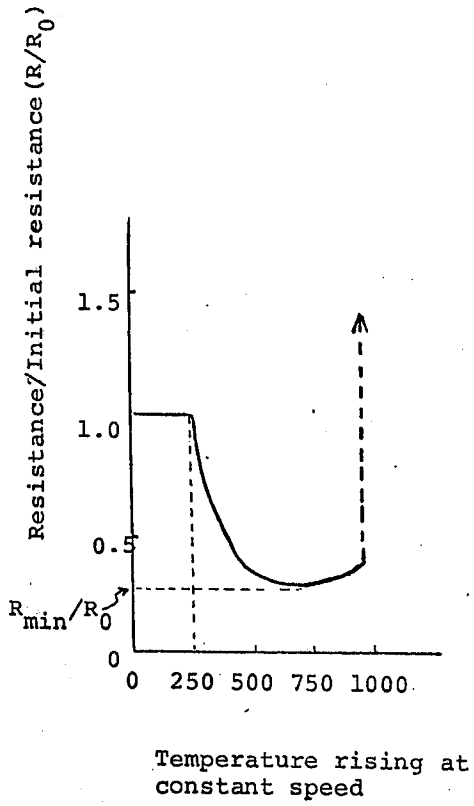
FIG. 2 is a graph showing temperature characteristic of resistance of a fusible metal film resistor of the invention.

The resistive film, described above, of the fusible metal film resistor according to the invention has a temperature vs. resistance characteristic as shown in FIG. 2. That is, while change of resistance is reversible with temperature coefficient of resistance with ± 50 ppm/° C over a low temperature range, at a temperature range higher than a certain point the resistance decreases abruptly and it becomes a minimum around 600° C. Around at 900° C, the resistive film is melted and disconnected. Therefore, when overloading the resistor of the invention, the temperature of the resistive film increases due to its self-heating, and beyond a certain temperature described above, the heating is further accelerated because of increase of current caused by abrupt decrease of the resistance. Then, the temperature increases around to 900° C very shortly, and the resistive film is melted and disconnected, It is confirmed according to experiments, that in order to drive the heating around to 900° C by self-heating as described above, the ratio of the minimum resistance ($R_{min}$) at a higher temperature range to the initial resistance ($R_O$), i.e. $R_{min}/R_0$, is required to be small.

Figure 3:
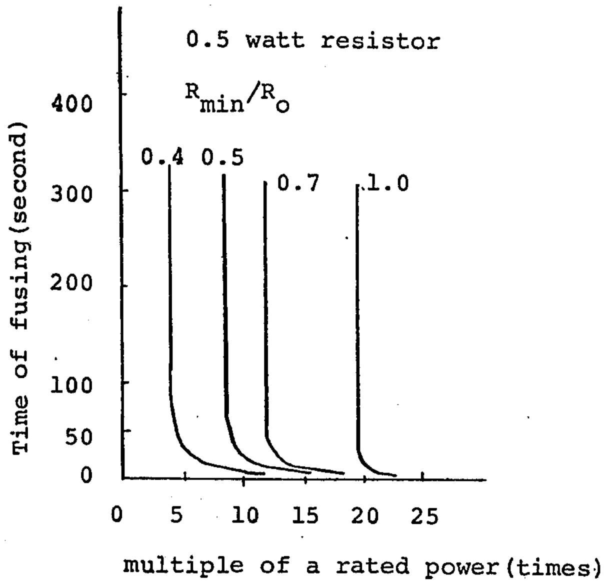
FIG. 3 is a graph showing a relation between overload power and time of fusion of a fusible metal film resistor of the invention.

FIG. 3 shows the relationship between the above mentioned ratio $R_{min}/R_0$ and the fusing characteristic of the resistor. In FIG. 3, there are shown the measured times of fusion at overloading for 0.5 watt resistors of different ratios of $R_{min}/R_0$. As understood from FIG. 3, the resistor is disconnected at overloading for a shorter time in accordance with decrease of the ratio of $R_{min}/R_0$.

The resistive film according to the invention is preferably heated, after being formed on the substrate, at a temperature of 100° to 300° C for a short time. By this heat treatment, the resistive film is provided with stable resistor characteristics, and especially a very small temperature coefficient of resistance. While the resistive film for which the above heat treatment is not performed causes a permanent change of resistance at a temperature beyond about 80° C, the thus treated resistive film has a stable characteristic with reversible resistance change up to a temperature corresponding to that of the heat treatment and with a temperature coefficient of resistance within ± 50 ppm/°C. Beyond that temperature, the resistance is decreased abruptly and the fusion occurs.

Although the characteristics somewhat similar to FIG. 2 are partially known for an alloy film such as Ni-P and Ni-B, because of comparatively small decrease degree of resistance at a higher temperature range, there is not provided in prior art the excellent fusion characteristics as is provided by the composition of the invention. Further, because a temperature coefficient of resistance of such conventional alloy film is large as above +100 ppm/°C, it is not preferably used as a precision metal film resistor. In the present invention, by the addition of at least one member of Fe, Mn, Sn and Bi in a certain propertion to the basic composition of Ni-P, there is provided a resistive film the resistance of which decreases remarkably at a high temperature and which has excellent fusion characteristics and very small temperature coefficient of resistance.

The resistive film of the invention is provided by an electroless plating process, as described hereinafter. The bath solution contains a nickel salt such as nickel sulphate or nickel chloride, and, as an additive metal salt, iron salt such as ferrous sulphate or ferrous chloride, tin salt such as tin tetrachloride, manganese salt such as manganese chloride, and bismuth salt such as sodium bismuthate. Further, it contains a complexing agent such as sodium tartrate, sodium potassium tartrate or sodium citrate, and if necessary boric acid as a buffer agent. For a reducing agent, sodium hypophosphite is used in the solution. The substrate, the surface of which is previously activated, is immersed in the bath solution of electroless plating process as described above, so as to form Ni film containing phosphorus and additive metal on the surface thereof. After the film is formed, it is heat treated usually at a temeperature lower than 300° C for a short time. The bath solution used for the invention has, for example, the following composition and conditions:

| | |
|---|---|
| nickel salt | 0.05 to 1.0 mole/l |
| additive metal salt | 0.1 to 0.3 mole/l |
| citrate | 0.1 to 2 mole/l |
| sodium hypophosphite | 0.15 to 15 mole/l |
| pH | 5 to 10 |
| temperature | 30 to 90 ° C |

The amount of an additive metal in the composition of the resultant plated film deposited on the surface of the substrate is dependent on the molar ratio of an additive metal salt to the sum of the amount of nickel salt and additive metal salt, and a desirable value of this ratio is 0.3 to 0.7 as determined by experiments. For the amount of a reducing agent, a molar ratio of the reducing agent to the metal salt is desirably 3 to 15. For the amount of a complexing agent, an amount the same or twice the number of moles of the sum of metal salts is desirable for stable and economic bath composition. Temperature and pH of the solution are dependent on the kind of the additive metal salt, and those as described are employed.

The Ni-alloy film deposited under the above plating conditions contains 4to 12 weight % of phosphorus and 0.05 to 10 weight % of at least one member selected from the group consisting of Mn, Sn, Bi and Fe, and a resistor made by this film shows desirable fusion characteristics with time of fusion being 15 to 25 seconds at a load ten times higher than a rated power consumption. Particularly, a resistor having Ni-alloy film containing 5 to 10 weight % of phosphorus and 0.05 to 6.0 weight % of iron shows fusion characteristics more desirable fusing characteristic with time of fusion being 5 to 10 seconds. For the composition of Ni-alloy film according to the invention, the amount of the additive metal less than the above mentioned lower limit undesirably results in long time of fusion and positively large temperature coefficient of resistance. Further, that amount more than the above mentioned upper limit also results in a long time of fusion and negatively large temperature coefficient of resistance. An embodiment of the invention is further described more practically in the following example.

EXAMPLE

A ceramic rod of 2 mm in diameter and 8 mm in length was degreased in hot alkali solution, and after being water washed it was immersed in stannous chloride solution so as to be sensitized. Then, the ceramic rod was immersed in palladium chloride solution and the surface thereof was activated. Then, according to the plating conditions as shown in the following table, there was formed a plated film of about 2 micron in thickness on the thus activated surface of the ceramic rod. After heat treatment of the resultant ceramic rod at 250° C for one hour, two caps to which lead wires were mounted respectively were press fitted to the both ends of the ceramic rod. The resistance value of the thus formed resistor was adjusted by spiral grooving of the film, and it was then an electrically insulating coat was applied to the surface of the resultant resistor and cured at about 150° C for 30 minutes. Then, there was provided a 0.5 watt metal film resistor. Table 1 shows the measured results of fusion characteristics and temperature coefficient of resistance of the thus provided fusing metal film resistor of the invention. As shown in Table 1, the resistor of the invention has an excellent fusion characteristics and a small temperature coefficient of resistance within ±50 ppm/°C. Especially, the resistor made by the Ni-alloy film containing 5.0 to 10.0 weight % of phosphorus and 0.05 to 6.0 weight % of iron is superior having a shorter time of fusion of from 5 to 10 seconds.

Table 1

| Sample No. | Plating Conditions: Amount in mol/l | | | | | pH | Temp. (° C) | Composition of resistive film* (wt.%) | | Characteristic of resistor: TCR** (ppm/° C) | $R_{min}/R_0$ | time of fusion (sec.)*** |
|---|---|---|---|---|---|---|---|---|---|---|---|---|
| 1 | $NiCl_2$ | $MnCl_4$ | sodium citrate | $NaPH_2O_2$ | | | | Mn | P | | | |
| | 0.35 | 0.01 | | | | | | 0.05 | 4.0 | −10 | 0.43 | 15 |
| | ∫ | ∫ | 1.0 | 5.0 | — | 10 | 35 | ∫ | ∫ | ∫ | ∫ | ∫ |
| | 0.48 | 0.15 | | | | | | 10.2 | 12.5 | 40 | 0.55 | 25 |
| 2 | $NiCl_2$ | $SnCl_4$ | " | " | $NH_4Cl$ | | | Sn | P | | | |
| | 0.06 | 0.01 | | | | | | 0.05 | 5.0 | −10 | 0.45 | 15 |
| | ∫ | ∫ | 0.4 | 2.0 | 1.0 | 8.9 | 80 | ∫ | ∫ | ∫ | ∫ | ∫ |

Table 1-continued

| Sample No. | Plating Conditions: Amount in mol/l | | | | | pH | Temp. (° C) | Composition of resistive film* (wt.%) | | Characteristic of resistor: TCR** (ppm/° C) | $R_{min}/R_0$ | time of fusion (sec.)*** |
|---|---|---|---|---|---|---|---|---|---|---|---|---|
| | 0.19 | 0.14 | | | | | | 10.0 | 12.1 | 40 | 0.56 | 25 |
| 3 | $NiSo_4$ | $NaBiO_3$ | " | " | | | | Bi | P | | | |
| | | 0.0001 | | | | | | 0.05 | 3.8 | −5 | 0.45 | 15 |
| | 0.2 | $\int$ | 0.4 | 2.0 | — | 10 | 90 | $\int$ | $\int$ | $\int$ | $\int$ | $\int$ |
| | | 0.0015 | | | | | | 10.8 | 11.8 | 50 | 0.55 | 25 |
| 4 | $NiSO_4$ | $FeSO_4$ | " | " | | | | Fe | P | | | |
| | 0.08 | 0.02 | | | | | | <0.05 | 12.3 | 150 | 0.80 | no fusing |
| 5 | 0.07 | 0.03 | | | | | | 0.05 | 10.3 | 40 | 0.35 | 9 |
| 6 | 0.06 | 0.04 | | | | | | 2.2 | 8.9 | −10 | 0.30 | 7 |
| 7 | 0.05 | 0.05 | | | | | | 4.5 | 7.0 | −20 | 0.22 | 6 |
| 8 | 0.04 | 0.06 | 0.2 | 1.0 | 0.5 | 7.0 | 90 | 5.9 | 5.2 | −30 | 0.10 | 4 |
| 9 | 0.03 | 0.07 | | | | | | 9.5 | 3.8 | −50 | 0.45 | 15 |
| 10 | 0.02 | 0.08 | | | | | | 11.5 | 3.3 | −200 | 0.60 | 60 |

*The remainder is Ni.
**Temperature coefficient of resistance.
***Time of fusion at load of 10 times higher than a rated power.

What is claimed is:

1. A fusible metal film resistor comprising a substrate of an electrically insulating material and a resistive film formed on said substrate, said resistive film consisting essentially of nickel, 4 to 12 weight % of phosphorus, and 0.05 to 10 weight % of at least one member selected from the group consisting of iron, tin, manganese and bismuth.

2. A fusible metal film resistor according to claim 1, wherein said one member is iron.

3. A fusible metal film resistor according to claim 1, wherein said one member is tin.

4. A fusible metal film resistor according to claim 1, wherein said one member is manganese.

5. A fusible metal film resistor according to claim 1, wherein said one member is bismuth.

6. A fusible metal film resistor according to claim 1, wherein said resistive film is heated at a temperature of 100° to 300° C.

7. A fusible metal film resistor according to claim 2, wherein said resistive film consists of 5.0 to 10 weight % of phosphorus , 0.05 to 6.0 weight % of iron and nickel.

8. A fusible metal film resistor according to claim 1 wherein said substrate is ceramic or glass.

* * * * *